UNITED STATES PATENT OFFICE.

ROBERT A. CHESEBROUGH, OF NEW YORK, N. Y.

PROCESS OF REFINING VASELINE.

SPECIFICATION forming part of Letters Patent No. 237,484, dated February 8, 1881.

Application filed March 6, 1874.

*To all whom it may concern:*

Be it known that I, ROBERT A. CHESEBROUGH, of the city, county, and State of New York, have invented a certain Process for the Refining of Vaseline, &c., of which the following is a specification.

Vaseline is a concentrated product of petroleum obtained by filtering the heavy undistilled residuums of petroleum through bone-black, as will be seen by reference to my Patent No. 127,568, dated June 4, 1872.

The residuums resulting from the ordinary process of distilling, by the vacuum process, or by the superheated-retort process are all suitable for manufacturing into vaseline; but the vaseline, when made from them, retains, in a greater or less degree, the taste, odor, and peculiar color of petroleum. It is desirable for some purposes to refine the vaseline, so as to make it perfectly free from the taste, odor, and color of petroleum, and to this my present process is directed.

After its manufacture the vaseline is put into open iron kettles (which are filled up quite full) and is then subjected to a slow heat, which is so graduated as to keep the vaseline constantly simmering and giving off vapor. This simmering process should be kept up for from twenty-four to forty-eight hours, or until the vaseline shall have parted with its odor and taste of petroleum, which appear to pass off in the vapors, and this period the practiced operator will soon learn to accurately determine by the smell and taste. The heat required for this process, however applied, will be a constantly rising one, from about 325° to 500° Fahrenheit, and in some cases even beyond that point, depending upon the body and character of the product, and its result will be to materially darken or blacken the products exposed to it. The vaseline is then brought down to a heat of about 200° Fahrenheit and carefully refiltered through bone-black a little finer than the finest sporting-gunpowder, and which should be put in the filters quite hot. The result is pure refined vaseline, varying in color from a pearly white at the beginning of the filtration to a deep-red color at its close, but perfectly free from the taste, odor, and color peculiar to petroleum.

The process may be varied by taking the residuum before its filtration and subjecting it to the above simmering process in open kettles, and then manufacturing it into odorless and tasteless vaseline by subsequent filtration. It will be found that increased solidity results from this slow-boiling process through a concentration of the heavier parts of the petroleum, and that the filtration through bone-black adds largely to the solidity of vaseline.

My invention is limited to the precise method of manufacture shown—viz., the slow boiling or simmering in open kettles of residuum and vaseline, in combination with a subsequent filtration through bone-black; and in order to prevent mistakes I will say that the results I obtain by the use of open vessels cannot be obtained by using closed ones and carrying the vapors through a worm for recondensation.

Vaseline refined by my process can be used to better advantage for toilet, medicinal, and other purposes in the arts than it can previous to such refinement, its freedom from odor and taste being greatly advantageous.

Petroleum-oil subjected to this process will present similar freedom from odor, taste, and color, and my invention is extended to cover its manufacture also by the same process.

What I claim as my invention, and desire to secure by Letters Patent, is—

The process of refining vaseline, petroleum-oil, and residuum by keeping them just at the point of vaporization in an open vessel until the disagreeable smelling portions are driven off, and afterward filtering through bone-black, substantially as and for the purposes specified.

ROBT. A. CHESEBROUGH.

Witnesses:
  C. A. McCREDY,
  THOMAS O'CONNELL.